United States Patent [19]
Frankowski

[11] Patent Number: 5,290,356
[45] Date of Patent: Mar. 1, 1994

[54] RUBBER CRUMB-REINFORCED CEMENT CONCRETE

[75] Inventor: Richard Frankowski, Mobile, Ala.

[73] Assignee: Tiremix Corporation, Mobile, Ala.

[21] Appl. No.: 872,494

[22] Filed: Apr. 23, 1992

[51] Int. Cl.⁵ .............................................. E01C 5/22
[52] U.S. Cl. ........................... 106/726; 52/DIG. 7; 52/DIG. 9; 404/32
[58] Field of Search .......... 106/697, 802, 726, 725; 404/32; 52/DIG. 7, DIG. 9

[56] References Cited

U.S. PATENT DOCUMENTS

| | | | |
|---|---|---|---|
| 3,891,585 | 6/1975 | McDonald | 404/32 |
| 3,930,100 | 12/1975 | McDonald | 404/32 |
| 4,082,888 | 4/1978 | Portin | 404/32 |
| 4,564,310 | 1/1986 | Thelen et al. | 404/32 |

FOREIGN PATENT DOCUMENTS

| | | | |
|---|---|---|---|
| 0092203 | 6/1982 | Japan | 404/32 |
| 0607868 | 5/1978 | U.S.S.R. | 404/32 |
| 338247 | 11/1930 | United Kingdom | 404/32 |
| 763395 | 12/1956 | United Kingdom | 404/32 |

*Primary Examiner*—Carl O. Friedman
*Assistant Examiner*—Christopher Todd Kent
*Attorney, Agent, or Firm*—Pravel, Hewitt, Kimball & Krieger

[57] ABSTRACT

Rubber crumb reinforced cement-concrete structures provide resistance to cracking, improve shock wave absorption, lower heat conductivity and improve the acoustical environment. The structures are comprised of cement-like materials having a predetermined proportion (from about 1% to about 30% by weight of cement) of recycled scrap rubber crumbs undirectionally aligned in the cross section of said structures.

7 Claims, 1 Drawing Sheet

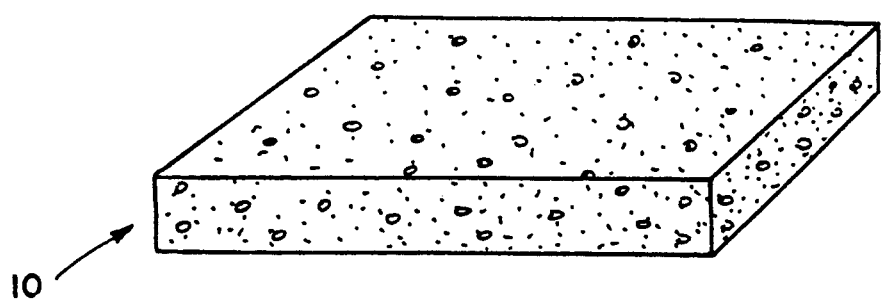
F I G. 1
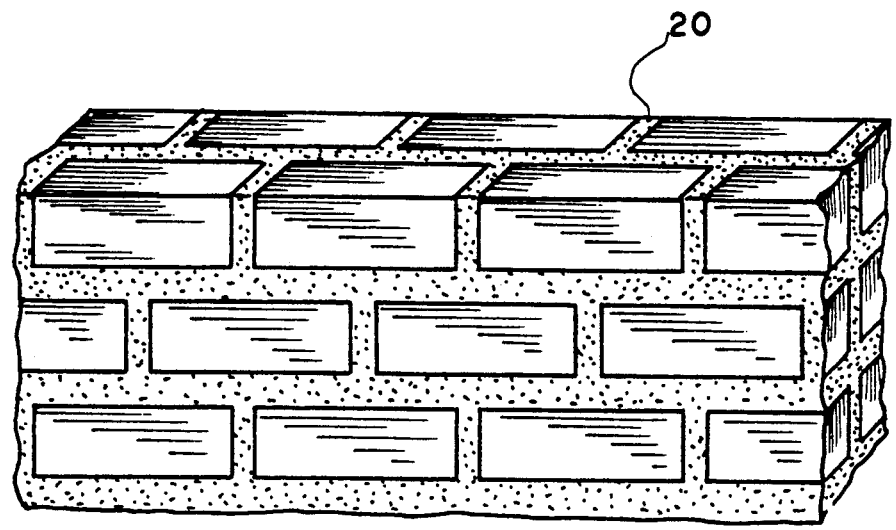
F I G. 2
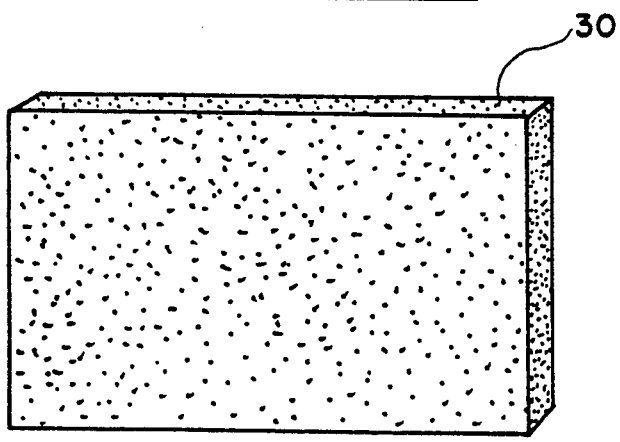
F I G. 3

RUBBER CRUMB-REINFORCED CEMENT CONCRETE

BACKGROUND OF THE INVENTION

1. Field Of The Invention

The present invention relates to improvements in the cement-concrete structures in general and, to the following in particular:
1) General purpose concrete (up to 3000 psi)
2) Exterior-interior cement board, and
3) Mortar, all of which provides resistance to cracking, improves shock wave absorption, lowers heat conductivity, and reduces noise levels simultaneously.

2. General Background

Conventional concrete is a mixture of cement (Ca, Si, Al, Fe, Mg, Na and K), sand, aggregate and water. It has been found that cements containing 1% or more of sodium oxide and potassium oxide will react with aggregates containing opaline silica, highly siliceous rocks and limestone. The formation of the new compounds causes the interior of the concrete to expand, resulting in surface cracking, which for years has been accepted as natural to its use.

Reinforced (steel) concrete was invented by Thaddeus Hatt in 1878, U.S. Pat. No. 206,112 and over the years many improvements have been made in the use of inorganic fibers and others, such as alumina, asbestos, glass, graphite, etc.; the features of which are disclosed, for example, in U.S. Pat. Nos. 3,992,172; 4,316,925 and 4,337,094.

SUMMARY OF THE PRESENT INVENTION

While the above and other improvements no doubt represent advances in the cement concrete structures, they do nothing in the areas of crack resistance, shock wave absorption, heat conductivity reduction, and noise level reduction.

Accordingly, it is an object of the present invention to provide rubber crumb reinforced cement-concrete structures that will implement the above mentioned improvements.

In accordance with this invention, these and other objects and advantages are achieved by dispersing said rubber crumbs (natural and synthetic) in the structures, from about 1% to about 30% by weight of the cement, based on product application.

BRIEF DESCRIPTION OF THE DRAWINGS

For a further understanding of the nature and objects of the present invention, reference should be had to the following detailed description taken in conjunction with the accompanying drawings, in which like parts are given like reference numerals, and wherein:

FIG. 1 is a perspective view of concrete of a first embodiment of the present invention.

FIG. 2 is a perspective view of a brick wall using mortar of the present invention.

FIG. 3 is a perspective view of a cement board of the present invention.

DETAILED DESCRIPTION OF THE PREFERRED EMBODIMENT

The improved cement-concrete structures of this invention are comprised of cement, sand, aggregates, additive agents and rubber crumbs. The rubber crumbs, recovered from scrap have emerged as a unique and significant reinforcing composite, which when mixed with the above materials produce the following advantages: resistance to cracking, improved shock wave absorption, lowered heat conductivity and reduced noise levels simultaneously.

These improvements are particularly valuable in areas of earthquake and hurricane occurrence, i.e. New Orleans, San Francisco, Tokyo, etc.

The embodiments of this invention are described below.

The concrete 10 of the present invention (see FIG. 1) is rubber-fiber-reinforced cement concrete consisting of 100 parts by weight of cement, from about 100 to 200 parts by weight of sand, from about 200 to 400 parts by weight of aggregate, from about 1 to 30 parts by weight of rubber crumbs, from about 40 to 50 parts by weight of water and a very small proportion of additives. This concrete is characterized by improved non-structural cracking, shock wave absorption, some chemical resistance to acids and alkaline, heat conductivity reduction, and noise level reduction.

The mortar 20 of the present invention (see FIG. 2) is rubber-crumb-reinforced mortar (masonry cement) consisting essentially of 100 parts by weight of cement, from about 100 to 300 parts by weight of sand, from about 1 to 30 parts by weight of rubber crumbs, from about 40 to 70 parts by weight of water and a very small proportion of additives. This mortar is characterized by reducing cracking and crumbling improvements, heat conductivity reduction, noise level reduction, and shock wave absorption.

The cement board 30 of the present invention (see FIG. 3) is rubber-crumb-reinforced exterior-interior cement board (tile backerboard) consisting of 100 parts by weight of alumina or portland cement, from about 100 to 200 parts by weight of light aggregate, from about 15 to 30 parts by weight of rubber crumbs, from about 40 to 60 parts by weight of water and a very small proportion of additives. This cement board has improved heat conductivity resistance, noise level reduction, and shock wave absorption.

While the above embodiments of this invention have been described, it is understood that the invention is capable of other embodiments. Also, it should be understood that the rubber crumb reinforced cement concrete terminology employed herein is intended to be generic and should not be regarded as limiting.

The new structures described herein made of cement-like material have as a discrete internal portion of the cross section a predetermined undirectionally aligned reinforcement comprised of recycled scrap rubber crumbs, (1% to 30% by weight of cement) (natural and synthetic) which provide the following benefits: 1) crack resistance; 2) heat conductivity reduction; 3) shock wave absorption and crumbling reduction; and 4) noise level reduction.

What is claimed as invention is:

1. A concrete/rubber product made from a mixture comprising:
    (a) 100 parts by weight of portland cement;
    (b) 1–30 parts by weight of rubber crumb;
    (c) 40–70 parts by weight of water; and
    (d) 100–200 parts by weight of material from the group consisting of sand, aggregate, and light aggregate.

2. The invention of claim 1, wherein:
    the concrete/rubber product is general purpose concrete;
    the amount of water is 40–50 parts by weight, and the material in part (d) is 100–200 parts by weight of sand and 200–400 parts by weight of aggregate.

3. The invention of claim 1, wherein:
the concrete product is mortar, and
the material in part (d) is 100–300 parts by weight of sand.

4. The invention of claim 1, wherein:
the concrete product is cement board,
the amount of rubber crumb is 15–30 parts by weight,
the amount of water is 40–60 parts by weight, and
the material in part (d) is 100–200 parts by weight of light aggregate.

5. A concrete/rubber product made from a mixture comprising:
(a) 100 parts by weight of a material from the group consisting of alumina and portland cement;
(b) 15–30 parts by weight of rubber crumb;
(c) 40–60 parts by weight of water; and
(d) 100–200 parts by weight of light aggregate.

6. The invention of claim 5, wherein:
the concrete product is cement board.

7. The invention of claim 5, wherein: the material in part (a) is alumina.

* * * * *